US007843819B1

(12) United States Patent
Beneviste (10) Patent No.: US 7,843,819 B1
(45) Date of Patent: Nov. 30, 2010

(54) PROTOCOL FOR WIRELESS MULTI-CHANNEL ACCESS CONTROL

(75) Inventor: Mathilde Beneviste, South Orange, NJ (US)

(73) Assignee: Avaya Inc., Basking Ridge, NJ (US)

(\*) Notice: Subject to any disclaimer, the term of this patent is extended or adjusted under 35 U.S.C. 154(b) by 947 days.

(21) Appl. No.: 11/393,127

(22) Filed: Mar. 29, 2006

Related U.S. Application Data (60) Provisional application No. 60/665,834, filed on Mar. 29, 2005, provisional application No. 60/673,368, filed on Apr. 21, 2005, provisional application No. 60/709,820, filed on Aug. 22, 2005.

(51) Int. Cl.
G08C 15/00 (2006.01)

(52) U.S. Cl. .................. 370/230; 370/338; 370/400; 370/437; 370/443; 370/445; 370/447; 709/237

(58) Field of Classification Search .............. 370/338, 370/447, 448, 350, 473, 503, 230, 445, 235
See application file for complete search history.

(56) References Cited

U.S. PATENT DOCUMENTS

| | | | | |
|---|---|---|---|---|
| 6,556,582 B1 * | 4/2003 | Redi | ............ | 370/443 |
| 2002/0154653 A1 * | 10/2002 | Beneviste | ............ | 370/447 |
| 2003/0135640 A1 * | 7/2003 | Ho et al. | ............ | 709/237 |
| 2004/0076164 A1 * | 4/2004 | Vanderveen et al. | ........ | 370/400 |
| 2005/0002364 A1 * | 1/2005 | Ozer et al. | ............ | 370/338 |
| 2005/0058151 A1 * | 3/2005 | Yeh | ............ | 370/445 |

OTHER PUBLICATIONS

Shih-Lin Wu; Chih-Yu Lin; Yu-Chee Tseng; Jang-Laing Sheu; A new multi-channel MAC protocol with on-demand channel assignment for multi-hop mobile ad hoc networks; Dec. 7-9, 2000; Parallel Architectures, Algorithms and Networks, 2000. I-SPAN 2000. Proceedings. International Symposium on; Digital Object Identifier 10.1109/ISPAN.2000.900290.*

Alberto Leon-Garcia and Indra Widjaja, Communications Netowrks Fundamental Concepts and Key Architectures, 2000, McGraw Hill Higher Education, pp. 418, 424-429.*

\* cited by examiner

*Primary Examiner*—Jason E Mattis
*Assistant Examiner*—Joey Bednash
(74) *Attorney, Agent, or Firm*—Chapin IP Law, LLC; David W. Rouille, Esq.

(57) ABSTRACT

A method and apparatus for providing channel access coordination in a BSS or a wireless mesh is presented. A control channel is assigned to a control radio. At least one data channel is assigned to at least one data radio. Control signals are transmitted and received on the control channel, and data is transmitted and received on the at least one data channel. Acknowledgements for the data are received on the control channel. A node having a plurality of radios can transmit and receive traffic on different data channels simultaneously.

19 Claims, 5 Drawing Sheets

PROTOCOL FOR WIRELESS MULTI-CHANNEL ACCESS CONTROL

CROSS REFERENCE TO RELATED APPLICATIONS

The present application claims the benefit of U.S. Provisional Patent Application No. 60/665,834, filed on Mar. 29, 2005, U.S. Provisional Patent Application No. 60/673,368, filed on Apr. 21, 2005, and U.S. Provisional Patent Application No. 60/709,820 filed Aug. 22, 2005; all of which are incorporated herein by reference.

BACKGROUND

Growth in demand for WLANs is driving the development of new technology to provide higher throughput. To a greater extent this growth is due to the increased number of users and applications desiring wireless transmission and to a lesser extent to the emergence of new applications needing higher transmission rates along a single connection between two points. Previous work has focused on increasing link throughput. This is necessary for single-stream high throughput applications. While it helps increase aggregate throughput, it is not the only way to do so. A MAC-based approach that enables the parallel use of multiple channels in a BSS, or a wireless mesh, can increase aggregate throughput.

IEEE 802.11 has been allocated multiple non-overlapping channels. (i.e., 3 channels are available in the 2.4 GHz ISM RF band for 802.11b/g and 12 channels in the 5 GHz U-NII RF band for 802.11a). These channels can be used simultaneously, if the transmitter of one channel and the receiver of the other have sufficient separation between them to render negligible any interference (referred to as adjacent channel interference or ACI) that would result from energy from the transmitter side lobes spreading out across the spectrum onto the other channel. When co-locating multiple radios in the same station, the interference arising when a station receives and transmits simultaneously on adjacent (in the RF spectrum) channels is so high that it blocks reception. Multiple radios are useful in stations where high traffic concentration is expected.

SUMMARY

Conventional mechanisms such as those explained above suffer from a variety of deficiencies. One such deficiency is that conventional 802.11 LANs operate using single channels.

Embodiments of the invention significantly overcome such deficiencies and provide mechanisms and techniques for channel access coordination in a wireless mesh. The Common Control Channel (CCC) protocol is a MAC protocol that extends the IEEE 802.11 distributed MAC protocol is used to enable use of multiple channels within a BSS or mesh network and the operation of multiple single-channel radios in the same device. CCC is still relevant when hardware is equipped to combat ACI and thus use adjacent control and traffic channel.

In a particular embodiment of a method for providing channel access coordination in a wireless mesh, a control channel is assigned to a control radio. At least one data channel is assigned to at least one data radio wherein the control channel is non-adjacent to the data channel. Control signals are transmitted and received on the control channel, and data is transmitted and received on the at least one data channel. Acknowledgements for the data may be received either on the same channel as the data [as done currently], or on the control channel.

Still other embodiments include a system including one or more devices configured to process all the method operations disclosed herein as embodiments of the invention. In such embodiments, the device may include a memory system, a processor, communications interface in an interconnection mechanism connecting these components. The memory system is encoded with a process that provides mechanisms and techniques for channel access coordination in a wireless mesh as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing mechanisms and techniques for channel access coordination in a wireless mesh as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Presented is a Common Control Channel (CCC) protocol, a MAC protocol that extends the IEEE 802.11 distributed MAC protocol to enable use of multiple channels within a BSS or mesh network and the operation of multiple single-channel radios in the same device.

The CCC protocol defines a flexible channel access architecture that works with arbitrary mixtures of devices having one, one-and-a-half and several radios per node and accessing different numbers of channels. It is based on distributed prioritized contention-based medium access, which reduces to the IEEE 802.11e EDCA MAC protocol for single-channel (and single-radio) devices. As such, it can be regarded as the natural multi-channel extension of EDCA. An additional radio (receiver) enables a station to monitor the activity on all channels carrying data traffic. Multiple radio devices are needed to accommodate high traffic concentration experienced in heavily used infrastructure BSSs or wireless mesh networks.

The CCC protocol distinguishes between two logical channel functions, the Control Channel (CC) and the Data Channel (DC). In the description that follows, stations or mesh points observing the CCC MAC protocol are referred to as 'nodes'. Nodes exchange control and management frames on the control channel. The data channels carry data traffic. Both control and data can be sent onto the same single physical channel if a node is equipped with a single radio. The CCC protocol in the single radio case reduces to the distributed IEEE 802.11 MAC protocol, with some efficiency enhancements that are optional. If, on the other hand, a node has multiple radios, one radio—the 'control radio'—is tuned to the control channel. The remaining radio(s), called the 'data radio(s),' are tuned to data channels. Whereas the control radio may be used for control and data traffic, only data traffic may be sent through the data radio(s).

Reservations for transmission on the various data channels are made by exchanging control frames on the control channel. As extensions of the legacy RTS and CTS messages, the CC-RTS and CC-CTS are used to reserve a data channel for the time it takes to transmit a Transmission Opportunity (TXOP). A TXOP is a sequence of frames (and their respective acknowledgements) transmitted serially, immediately following a single successful contention-based channel access attempt, as for instance that prescribed by the IEEE 802.11e standard. The particular data channel selected for transmission of the TXOP is indicated in a special field on the CC-RTS/CC-CTS. The CC-RTS/CC-CTS exchange could be defined so that it can reserve multiple data channels, or a data channel and the control channel, for the same time interval. A node keeps track of the length of time for which a channel(s) is reserved in a channel-specific NAV, based on the value of the Reservation Duration field of the CC-RTS/CC-CTS.

Figure 1:
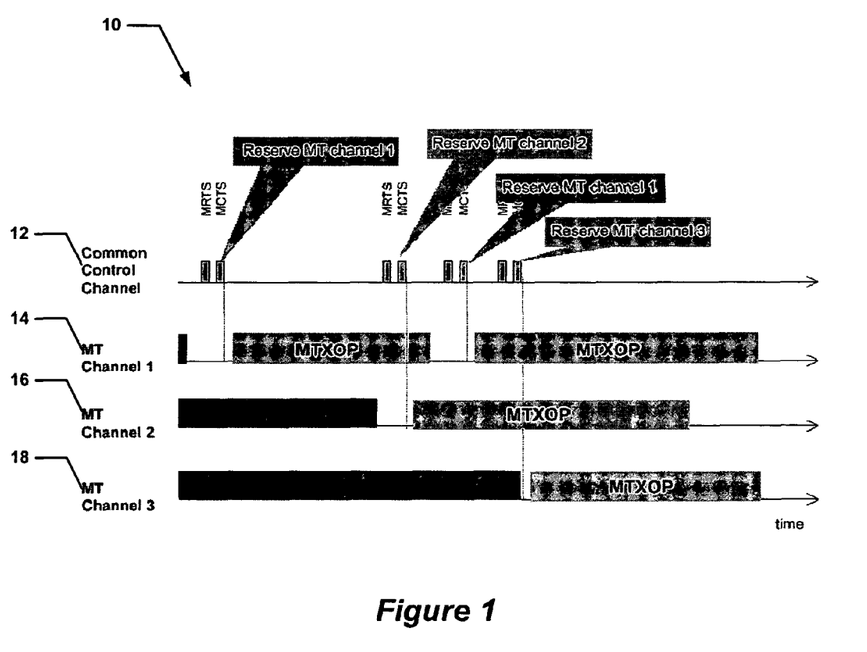
FIG. 1 comprises a diagram showing transmit channel usage in accordance with embodiments of the present invention.
Figure 2:
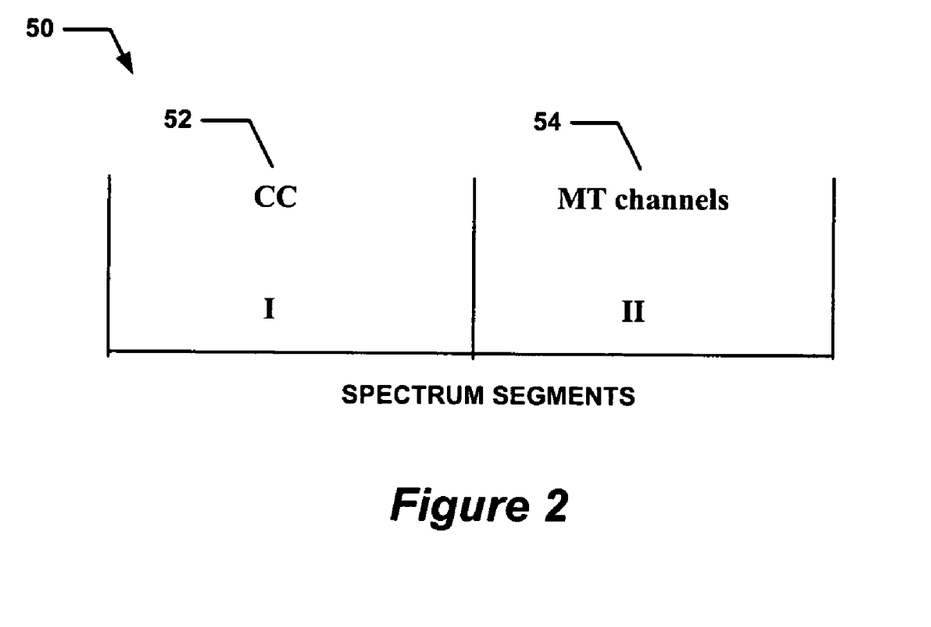
FIG. 2 is a diagram showing spectrum separation between a control channel and one or more data channels.

FIG. 1 illustrates the concept of a Control Channel (CC) and Data Channels (DCs) as well as the basic channel access mechanism. In the illustrated example 10, the nodes have access to three data channels (14, 16, and 18) and a control channel 12. Reservation of a data channel may commence shortly before the data channel becomes idle. The time when this occurs is discerned from the NAV for that channel, maintained by each node. DC 14 is the first channel to be reserved, shortly before it becomes idle. Two reservations are secured subsequently on DC 16 and DC 14 right as the two channels become available. DC 18, which is busy in the meanwhile, does not have a reservation waiting when it becomes available. DC 18 will sit idle until a frame/TXOP arrives. Both the forwarding and receiving node maintain a channel state vector [Channel-State=0 indicates that the data channel is idle] or a NAV for each usable channel. A node monitors the control channel and keeps track of all reservations made by other nodes to determine the busy/idle status of data channels, and when they will become available. The Reservation Duration field on the CC-RTS/CC-CTS is used to update the NAV for the channel reserved. The CC-RTS/CC-CTS Reservation Duration field is different from the Duration/ID field in the MAC header of the CC-RTS/CC-CTS frames. The latter indicates the length of the CC-RTS/CC-CTS transmission on the control channel. A reservation request is declined if the receiving node deems the requested channel busy, or if all its radios are busy.

The busy/idle status and/or the NAV timer is also updated from NAV-setting requests heard over the data radio. NAV updates from the data radio become important if the wireless mesh co-exists with independent WLAN users. If data channels are assigned dynamically, NAV synchronization can be achieved with greater certainty by tuning a radio to the selected data channel as early as possible and no later than the generation of a CC-RTS or CC-CTS reserving that channel.

The data channel reserved for the transmission of a TXOP is selected from among a set of "permissible" channels maintained by a node. The reservation exchange may start while the data channel is busy, but the data channel must be idle when the reservation process is completed. Advance reservation of the data channel is not permitted in order to ensure proper prioritization of data traffic. That is, higher-priority frames will be transmitted before lower-priority frames that may have arrived earlier.

The receiving node responds with a CC-CTS within a time interval of length SIFS. A CC-CTS is sent to indicate acceptance of a channel reservation request. The Reservation Duration field is copied in the CC-CTS sent by the receiving node. If a CC-CTS is not received, the forwarding node assumes that the reservation request is declined. A reservation is accepted if the data channel indicated in the CC-RTS will become idle within a pre-specified time interval, according to the NAV maintained by the receiving node and if the receiving node has available radios to receive the transmission. Successful receipt of a data traffic transmission is followed by an acknowledgement sent either on the data channel according to EDCA rules or as a group acknowledgment on the control channel.

Nodes are aware of the busy/idle status of all channels through the control radio, which monitors both the activity on that channel and the reservations for data channels. To prevent loss of that information, the assignment of a physical channel to the control radio is generally static (that is, it changes infrequently, and only if it becomes necessary). In contrast, the physical channel assignments of data radio(s) can be dynamic. This flexibility enables a node to use any of several data channels based on availability, thus allowing better overall channel utilization. To be able to monitor the control channel and transmit on a data channel, it is sufficient for a node to be equipped either with two receivers and one transmitter, or with two full radios. In the former case, the transmitter must be retuned from the control channel to the data channel before transmitting data.

A Control Radio is needed per node for the control channel. This radio will monitor the control channel to establish whether its data channel is reserved/busy and for acknowledgement of received transmissions.

MT Radio(s) are used by a node for forwarding mesh traffic. This radio will be set to transmit on the node's data channel when the node is sending traffic to a neighbor node. This radio will be set to receive on a node neighbor's data channel when the node is receiving traffic to the neighbor node. Even when a single data channel is assigned per node, multiple data radios per node will enable it to receive mesh traffic from multiple mesh neighbors simultaneously, and thus enhance performance.

For managed mesh networks there exists an entity responsible for the assignment of channels to all nodes and BSSs. For unmanaged mesh networks the control channel is selected by the portals (e.g. the first portal to power on). A node selects its data channel (e.g. by using DFS). Neighboring nodes may have different assigned data channels. A MAP selects its BSS channel (e.g. by using DFS).

A node may attempt transmission on a data channel once it has secured a reservation, provided the CCS indication on the data channel is idle. A node transmits mesh traffic on a data channel on which a reservation has been secured. Provided the CCS indication on the data channel is idle, the node will transmit after an idle PIFS or AIFS time interval, depending on the priority assigned to mesh traffic. Contention based access is used for transmission on the data channel in order to avoid collisions with independent WLAN(s) operating in the same area, on the same channel. In the event of a collision due to independent transmissions on the data channel, the node will attempt re-transmission using the rules of the CSMA/CA protocol. This allows a wireless mesh network to co-exist with WiFi users operating in the same area as the mesh.

Before describing the frame formats and handshake signaling it is important to define certain terms used in the description. A Source node is the node initiating a TXOP. A Destination node is the node receiving a TXOP.

Different frames utilized include a CC-RTS frame, used by a node initiating a TXOP. This frame includes several fields including a source node; a destination node; a source node transmit channel; a duration and a number of frames in TXOP. A CC-CTS frame is used by a node accepting a TXOP. The CC-CTS frame includes several fields including a destination node; a source node; a source node transmit channel; a duration; a number of frames in TXOP; and a Radio Counter. A CC-ACK frame identifies the individual frame in a sequence of frames that were received successfully. The CC-ACK frame includes a destination node; source node; and a TXOP frame receipt status.

A node will maintain the Channel State for its own data channel and the data channels assigned to mesh neighbors. A Channel-State of 0 indicates that the data channel is idle. The Channel State of a data channel is determined by tracking on the control channel the reservations made for the data channel. A node will maintain the Radio Counter for the number of radios it has available to receive a mesh transmission. When a reservation is made to send mesh traffic to a node, its Radio Counter is decremented by 1. When the reservation expires, the Radio Counter is incremented by 1. For example, a node that has a single data radio, will set the Radio Counter field to 0 in the CC-CTS sent to accept a channel reservation.

A Mesh Transmit Opportunity comprises a node TXOP between two mesh points. A node with frames to transmit to another node will contend on the control channel using CCC to reserve its assigned data channel for the transmission of the frame sequence Channel Reservation occurs when the source node reserve its data channel for one or multiple frames by sending a CC-RTS frame to the destination node on the control channel, provided the Channel_State indication for the data channel is idle. The Reservation Duration field and number of TXOP frames are set in the CC-RTS. The destination node sends a CC-CTS in response within SIFS. The reservation request is accepted if the destination node has a Channel_State idle indication for the source node's data channel, and the destination node has available radios to receive the transmission; i.e. the Radio Counter is non-zero. If the reservation request is accepted by the Destination node, the Reservation Duration field is adjusted and the number of frames in the TXOP is repeated in the CC-CTS sent by the destination node and the CC-CTS includes the number of its radios that remain available to receive traffic—that is the Radio Counter. (The latter is not necessary, but it is useful to other nodes with frames to send to the destination node). If the reservation request is declined by the Destination node, the Reservation Duration field in the CC-CTS is set to 0 and the source node in that case sends another CC-RTS with a Reservation Duration field set to 0. Additionally, the destination node will send a CC-CTS with a 0 in the Reservation Duration field in response to a CC-RTS with a Reservation Duration field set to 0.

When all frames in a TXOP are transmitted, the destination node will acknowledge the status of the transmit sequence by sending an acknowledgement, called CC-ACK, on the control channel. The frames received successfully will be identified in the CC-ACK. The acknowledgement will be transmitted by contending at the highest access priority Aside from these additions and a special form of acknowledgement (which is discussed below), the CCC protocol observes the rules of the distributed random access protocol of IEEE 802.11 and its amendments (DCF and EDCA) for channel access and virtual carrier sensing, although further enhancements can enable better channel access prioritization, although further enhancements can enable better channel access prioritization. For instance, a node that secures the reservation of a data channel will transmit on the reserved channel only after listening for a period equal to the arbitration inter-frame space to ensure that the channel is idle.

Successful transmissions can be acknowledged, if desired. Nodes with a single radio (which transmit data on the control channel) can employ any of the acknowledgement forms provided by the 802.11 standard and its amendments. The same holds for nodes with two radios, one control radio and one data radio, except in certain situations when communicating with a node with multiple data radios.

Nodes may also transmit a group acknowledgement on the control channel, called the CC-Acknowledgement (CC-ACK), in order to notify the sender of the successful receipt of a TXOP. The CC-Ack would be used in order to avoid adjacent channel interference or in order to avoid exposed nodes.

CCC is backward compatible with existing 802.11 technologies. All nodes, that is both nodes using existing 802.11 technology and CCC compliant nodes, can communicate on the control channel through the existing 802.11 MAC protocol.

Alternatively, communication with/between nodes not compliant with the CCC MAC could use a secondary control channel. This secondary control channel is identical to the channel serving an 802.11 BSS. The existing 802.11 MAC protocol would be used to access the secondary control channel. Use of a secondary control channel would be attractive in an infrastructure BSS, where all nodes communicate only with the AP. A CCC-compliant AP with multiple radios would dedicate one radio to the secondary control channel. All CCC non-AP nodes, which will not use this channel, need not monitor it. The secondary control channel cannot be adjacent to any of the data channels or to the control channel.

The control and data channels can have different PHY protocols, and the same control channel can be used for reservation of data channels with diverse PHY protocols (e.g., 11b, 11g, or 11n channels).

The forwarding and receiving nodes exchange a RTS/CTS on the control channel in order to reserve a data channel for a TXOP. Reserving a channel other than the control channel for data traffic must be indicated on the RTS/CTS. The extended RTS/CTS is called CC-RTS (mesh RTS)/CC-CTS (mesh CTS). The new frame contents are as follows.

The CC-RTS frame contains the following fields: Forwarding node address, Receiving node address, Transmit channel, and TXOP Duration. The CC-CTS frame contents are: Forwarding node address, Transmit channel, and TXOP Duration.

For nodes with a single radio, the 802.11 legacy RTS/CTS can be used for reservations and CCC is simply EDCA. In that form nodes can be used in homes to extend the reach of a BSS. Existing silicon can be employed for single-radio nodes.

With an additional receiver and CC-RTS/CC-CTS frames, one has full CCC capability. This brings multi-channel throughput, and high-rate links if additional radios are added per node. The latter are needed in large—e.g. corporate/municipal—meshes, especially near the portal.

While a multi-radio node may transmit and receive traffic on different data channels simultaneously it need not keep all radios constantly powered—as required by other protocols—in order to be able to receive notice of transmissions destined to it. It is sufficient to keep only the radio tuned to the control channel powered, where notice of all transmissions directed to the node will arrive. This way, the proposed MAC protocol helps preserve battery life in multi-radio battery-powered nodes. A battery-powered device may engage in power saving, by periodically switching its control radio from Awake to Doze modes, just like any EDCA power-saving device.

The CCC MAC protocol makes channel assignment very simple. A single control channel is assigned; it is selected when a mesh starts. Mesh points inherit the selection for the control channel as they associate with the mesh. If two mesh networks merge to form a single combined mesh, one of the mesh networks changes its control channel. Which of the two merging mesh networks is the one to change control channel can be determined in a distributed way. The beacon time stamp of a mesh network will indicate its age. The newer of two merging mesh networks will change its control channel to coincide with that of the mesh network started first. A change in control channel may be necessary also in order to comply with 802.11h DFS requirements.

Data channel assignment can employ either dynamic channel assignment or fixed channel assignment. The former is simpler from an administration perspective. A data channel is assigned on a channel availability basis, per-TXOP. A node that has a TXOP to transmit checks the availability of the data channels in a "permissible channel set" and selects an available data channel that is appropriate for the transmission of the TXOP. In general, different data channels may be appropriate for different receiving nodes depending on their radios and environmental considerations. If an appropriate channel is not available, the node will select the channel that will become available first according to the NAV. More intelligence may be added to the selection of a data channel from the permissible set. Fixed channel assignment can be implemented by limiting the permissible set to one appropriate channel for each neighbor node.

According to the CCC protocol, channel assignment does not add administrative complexity when dealing with mobility or recovery from node failures. Adjustments to a new mesh topology are fast as control communication continues on the same control channel and only one channel, the control channel, needs to be scanned for beacons.

Each node maintains a set of "permissible" channels. This set consists of channels that have low noise and are lightly loaded. A node monitors channels regularly in order to add channels to the permissible set or eliminate unacceptable channels from the permissible set, which is updated over time. Signal strength and other metrics indicating traffic load and congestion (e.g., channel utilization and number of collisions) are measured. The permissible channels meet 802.11h DFS requirements. If an independent AP powers on and chooses to operate on one of the permissible channels, that channel will be removed from the permissible set. Permissible channels may be ranked in order of desirability of the channel, using different metrics. One such metric would be traffic load, to avoid co-channel interference and collisions with other users of the channel.

The proposed MAC protocol is a multi-channel generalization of CSMA/CA. nodes with a single radio, which would use the same physical channel for the control and logical channel functions, access the wireless medium through the 802.11e EDCA protocol using CC-RTS/CC-CTS for reservations.

When a separate physical channel is used for data traffic and control traffic, the access mechanism is differentiated accordingly. The two access methods are described below.

Access to the data channel follows the 802.11e EDCA protocol. Prioritized access, as provided by EDCA, enables data traffic to compete with independent WLAN traffic for access to the data channel on the basis of the priority of the TXOP.

If a mesh network were located in an area without any independent WLAN users, it would have sufficed to access the channel without prior carrier sensing, as co-channel use in a BSS associated with a MAP can be coordinated to avoid overlap in time. Carrier sensing becomes necessary only because independent WLAN nodes are unaware of the mesh presence and, more importantly, may not be equipped to communicate with the mesh network.

Using the EDCA protocol for data channel access in the absence of independent WLAN users does not impose a substantial penalty with respect to channel utilization. According to the CSMA/CA rules, a node may access the channel without backoff delay if the frame pending transmission is generated while the channel is idle and it remains so for a time interval that depends on the access priority of the frame. As a consequence, TXOP duration would increase by a time interval equal to the AIFS (arbitration inter-frame space) of the data traffic.

In the presence of independent WLAN users, the transmitting node may find the reserved data channel. This may occur in spite of the monitoring the data channel for RTS/CTS reservations, as independent WLAN users may access a channel without the prior exchange of RTS/CTS. The CCC node will defer transmission on the data channel and follow the backoff and collision resolution procedures of CSMA/CA. If necessary, the reservation will be extended, by exchanging another CC-RTS/CC-CTS on the control channel.

Having a receiver tuned to the data channel intended for reservation by the transmitting node ensures that, the transmission on the data channel will not cause a collision to independent WLAN users (that is WLAN users not associated with a CCC mesh or BSS) that have reserved the same channel by exchanging RTS/CTS. If the receiving node is also monitoring the same data channel at the time the CC-RTS is received, a CC-CTS would be sent to accept the reservation only if the data radio gives no indication that the data channel is occupied by independent WLAN users. If the receiving node is not monitoring the requested data channel, it is possible that the data channel is in use by independent WLAN users and, as a consequence, a transmission on the data channel may not be received successfully at its intended destination node. To minimize the channel time wasted on an unsuccessful transmission in such a case, the CC-CTS could be formatted to indicate so to the transmitting node, and request it to precede a transmission on the data channel with a RTS/CTS. This way, if independent use of the data channel blocks receipt of the RTS at the receiving node, it will quickly become apparent to both nodes that a transmission on the reserved data channel would be unsuccessful and thus enable them to pursue the reservation of another data channel on the control channel without undue delay.

Prioritization of data traffic transmissions occurs during the reservation process on the control channel (i.e., during CC-RTS transmission to reserve a data channel for a TXOP). A CC-CTS is transmitted on the control channel following receipt of a CC-RTS after a specified idle interval (e.g. SIFS).

Following the successful transmission of a TXOP, there are two choices in acknowledging the transmission, if acknowledgement is desired. Acknowledgement may be sent either on the data channel (similar to 802.11 and 802.11e), or on the control channel by sending a group acknowledgement, called CC-ACK (Control Channel-Acknowledgement). The CC-ACK identifies the individual frames in a sequence of frames that were received successfully. The CC-ACK is transmitted either when all frames expected in a TXOP are received, regardless of errors, or when the reservation expires. The advantage of using a CC-ACK optional feature relates to avoidance of adjacent channel interference and to the exposed node problem, which are discussed later.

Mesh control traffic will access the control channel with higher priority than the frames from independent WLANs. The reason for prioritizing control traffic is to expedite reservations for the data channels, thus enabling forwarded traffic to contend for the data channels on an equal footing with independent WLAN traffic. Prioritization of control traffic does not penalize independent traffic seriously because control traffic is light compared to mesh forwarded traffic (assuming that TXOPs are used).

If a CC-ACK is used for acknowledgement, it is assigned the highest priority access category. The same node may transmit a CC-RTS within a SIFS idle interval of sending a CC-ACK to acknowledge receipt of a TXOP. A CC-RTS and a CC-ACK may be piggybacked, provided they have the same destination.

The optional CC-ACK acknowledgement frame contains the following: Receiving node address; Forwarding node address; Transmit channel; and TXOP frame receipt status.

The data channel is reserved right before it becomes idle. Reserving a data channel well in advance of its becoming idle, possibly on a first-come-first-served basis, is not desirable when traffic is prioritized. A lower-priority TXOP/frame that arrives first should not secure a reservation before a subsequent higher-priority TXOP/frame. QoS is provided by QoS-aware access mechanisms at the BSS and expediting forwarding on the mesh backbone. QoS prioritization at the BSS of a MAP follows either of the 802.11e access mechanisms, HCCA or EDCA. Traffic on the control channel is prioritized by EDCA or other prioritized access mechanisms, such as NAV Filtering. Prioritization helps achieve the following: distinguish between applications with different QoS requirements, bound delays of jitter sensitive applications, and reduce forwarding delays by eliminating traffic bottlenecks.

Prioritization of data traffic transmissions occurs during channel reservation. CC-RTS priority may reflect various goals. One goal is frame prioritization. Mesh traffic is prioritized based on the user priority of the frames—frames of time-sensitive applications will get higher priority. The TXOP, for which the data channel is reserved, includes a TXOP user priority. Another goal would be path prioritization. Mesh traffic is prioritized based on the path traversed in order to alleviate bottlenecks (long queuing delays and buffer overflow). The source node reserving a data channel for the transmission of a TXOP will have a node priority.

The CC-RTS priority will be a combination of the two priorities: the TXOP user priority and the node priority. The source node has the information needed to determine the CC-RTS priority. To give priority to time-sensitive frames in a congested mesh, the CC-RTS reserving data channel time for a TXOP will be assigned a priority that will depend on the user priority of frames in the TXOP. The TXOP user priority is set to the lower priority of the frames included in the TXOP. This avoids a long MXTS, loaded with low-priority traffic, accessing the channel at higher priority by including a high-priority frame, which would be possible otherwise.

Mesh bottlenecks are avoided by facilitating channel access at nodes with heavy mesh traffic loads. A node closer to a portal has more traffic to transmit than a node further away. The CC-RTS reserving data channel time for a TXOP transmission is assigned a node priority, to be used in conjunction with the TXOP user priority. Different source nodes will have different node priority, which may change over time. The node priority will depend on the queue size divided number of data radios of the node. The node priority must be higher for nodes with longer queues. Nodes with fewer data radios need more help to reduce congestion.

When multiple queues are used in a node for prioritization purposes (as in EDCA), a weighted queue size will be used for the node favoring the higher-priority queues. The queue-specific weights may vary also with the residual life of the frames in an EDCA queue (as frames close to being dropped take on greater urgency to transmit); that is, the weight will depend on: (MSDU Lifetime Limit—MSDU Lifetime) for an EDCA AC.

When the CC-RTS for a TXOP is transmitted on the control channel, prioritized channel access is employed. The access priority of a CC-RTS is a combination of the following:

TXOP user priority reflects the user priority of the TXOP frames—TXOP residual lifetime represents the aging of TXOP frames; and Mesh point priority reflects the congestion condition at the node A node has the information needed to determine the CC-RTS access priority The TXOP user priority is the highest user priority of the frames included in the TXOP. Based on the user priority, frames are assigned an AC (access category). The channel access parameters (AIFSN, CWMin, CWMax) and TXOP_limit depend on the assigned AC. The residual lifetime of a frame is the time remaining until its expiration. When a frame enters the mesh at a MAP/or mesh portal, the residual lifetime (RLT)—i.e. the age when the frame expires and thus must be dropped—is added to clock time to give the expiration time (ET) of the frame. The expiration time is included in the frame. At each hop, the residual lifetime is the difference between the expiration time on the received frame and the node clock time. The CC-RTS access priority is adjusted for the residual life of the TXOP frames. The CC-RTS for a TXOP containing a frame with remaining lifetime below a specified threshold will have its priority increased. Giving higher priority to frames based on age reduces the delay in traversing the mesh and increases throughput (reduces dropped-frame rate). The node priority depends on the traffic load on a node. Nodes with the same CC-RTS user priority will be able to access the control channel sooner if they have long data traffic queues. Mesh bottlenecks are avoided by expediting channel access by nodes with heavy mesh traffic loads. The node priority depends on the queued traffic adjusted for the number of transmit radios at the node. The mesh priority will be higher for nodes with longer queues. To balance loads across all channels, nodes with fewer transmitting radios need more help to reduce congestion. When multiple queues are used for prioritization purposes (as in EDCA), a weighted queue size will be used favoring higher-priority queues.

When a CCC is used on the backbone of a wireless mesh network, and a CCC-compliant node is both a mesh point node and an AP, a data channel can be the same physical channel as that used by the associated BSS. Similarly, a mesh point may be a station with its own application traffic in addition to the mesh (forwarding) traffic. The proposed MAC protocol provides mechanisms that differentiate between BSS and mesh traffic and allow for congestion control and QoS management. Alternatively, a radio in a multi-radio node may be shared by BSS or application traffic and mesh traffic.

To avoid collisions between mesh traffic and BSS traffic of a mesh AP (MAP), channels can be shared in time. The MAP can reserve a data channel for BSS traffic by sending a CC-CTS addressed to itself. The CC-CTS indicates the data channel a MAP has selected for use in the BSS and the length of the time interval for which the BSS will have exclusive used of the data channel. Stations in the BSS may transmit to the MAP, or among themselves, and the MAP may transmit frames to the stations during the reserved time interval. This time interval is made short, and the MAP does not reserve the channel again until some time has elapsed to permit others to use of the channel.

In order to block use of the BSS channel by the BSS stations when it is not reserved, the MAP must send a frame that will set the NAV in the BSS and thus prevent all legacy stations from accessing the BSS channel for a specified time interval. At the same time, any data radios listening to the BSS channel must not adjust their NAV for the BSS channel according to the Duration field of this frame. To do this, the MAP sends a QoS CF-Poll frame addressed to itself. The Duration field contains the time interval for which the BSS stations must refrain from accessing the BSS channel. Stations in the BSS will adjust their NAV accordingly. nodes will disregard such a frame. Therefore, nodes hearing a QoS CF-Poll with the same MAC address in Address1 and Address2 fields of the MAC header and non-zero Duration value will ignore such a frame, and not adjust their NAVs according to the Duration field.

The above approach also provides a means of addressing the problem of overlapping [co-channel] BSS using HCCA, which assumes contention-free access to the BSS channel.

A data radio can be shared between mesh traffic and BSS traffic of a MAP. To switch a radio between serving the BSS and the mesh, a MAP can block BSS transmissions from its stations. As done, above, the MAP sends a QoS CF-Poll frame addressed to itself on the BSS channel, specifying in the Duration field the time interval for which the BSS must refrain from accessing the channel. Stations in the BSS will adjust their NAV accordingly. Nodes will not adjust their NAV when they hear a QoS CF poll with the same MAC address in Address1 and Address2 fields of the MAC header and non-zero Duration value. During that time interval, the MAP radio can be set to any data channel, reserved by a CC-RTS sent to a mesh neighbor, to transmit mesh traffic.

Figure 3A:
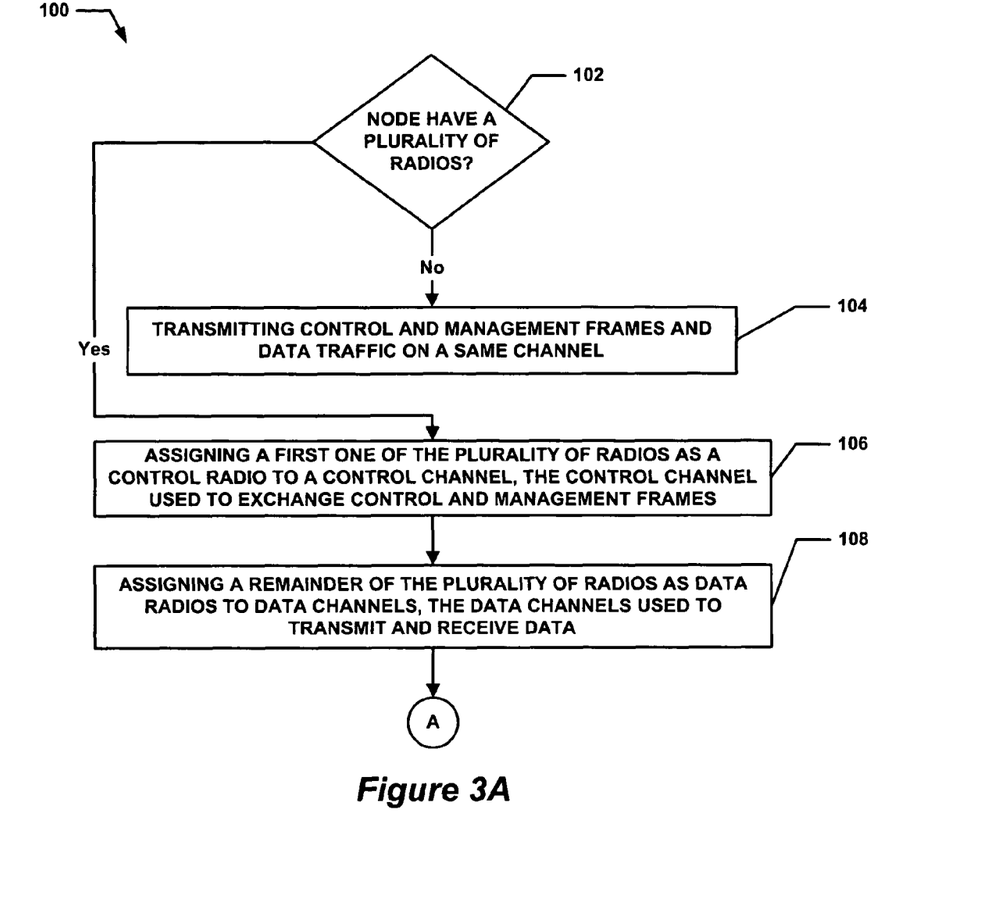
FIGS. 3A-3C comprise a flow chart of a particular embodiment of a method of providing mechanisms and techniques for channel access coordination in a wireless mesh.
Figure 3B:
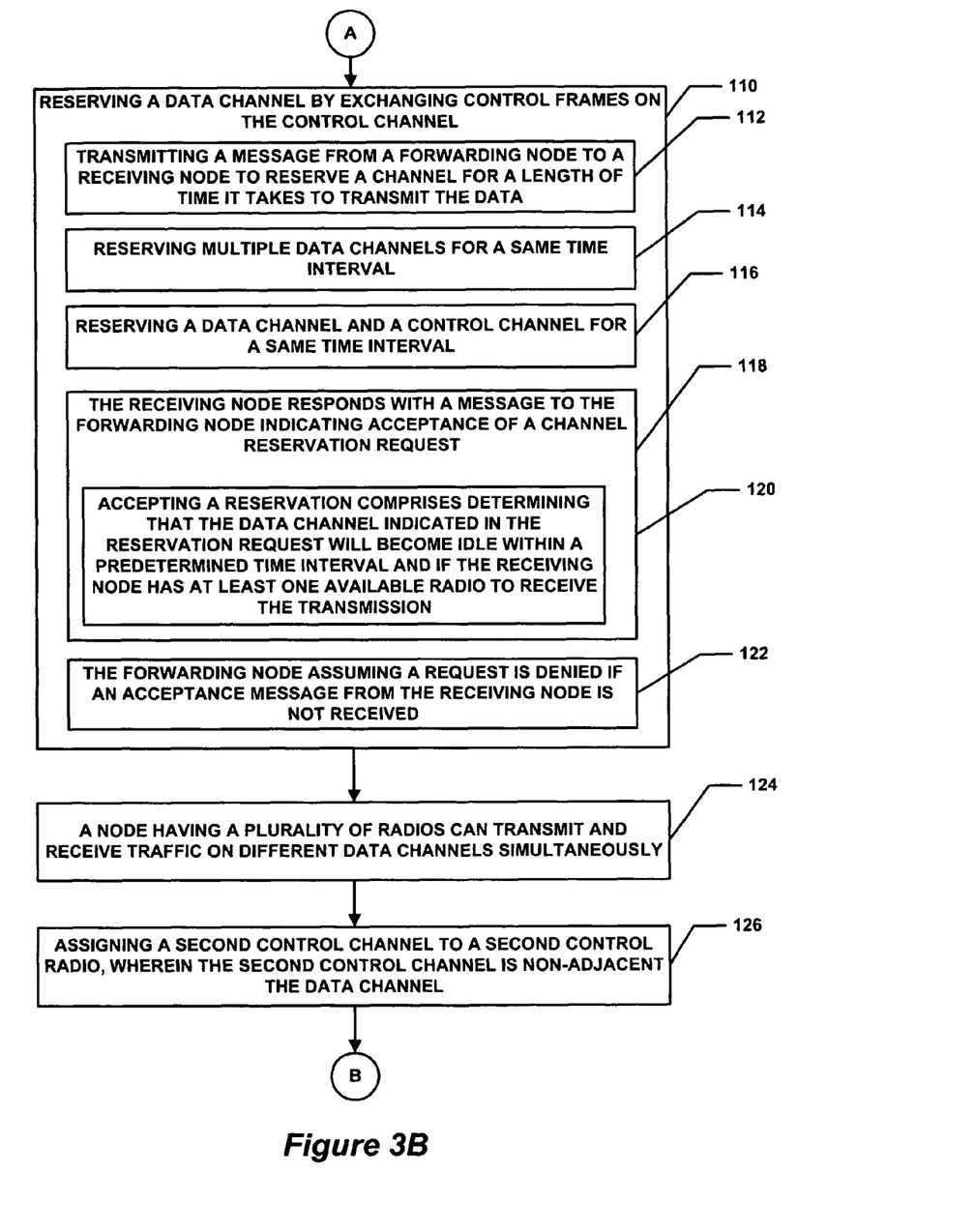
Figure 3C:
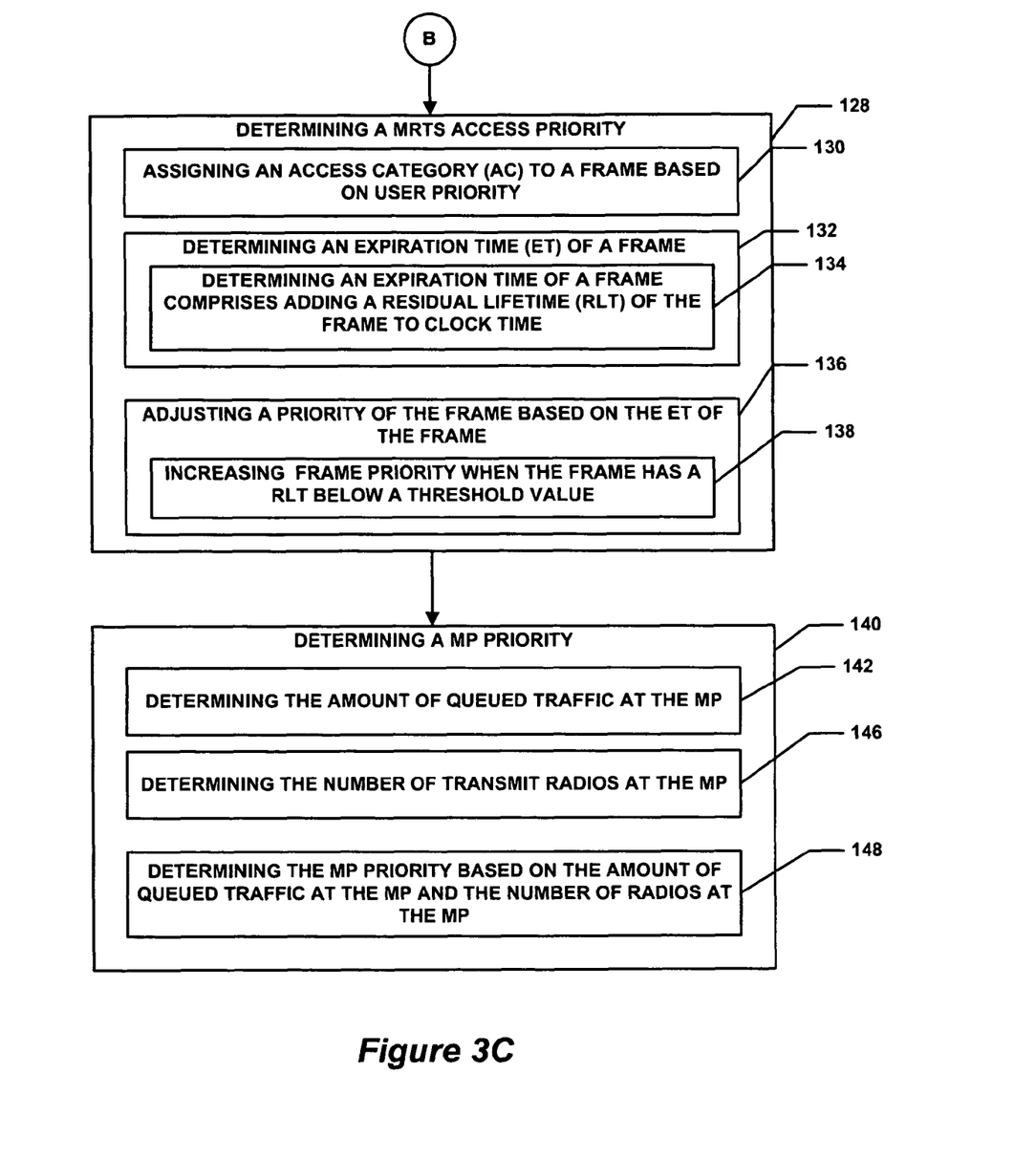

A flow chart of a particular embodiment of a method for performing channel access coordination in a wireless mesh is depicted in FIGS. 3A through 3C. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 3A through 3C, a particular embodiment of a method 100 of providing channel access coordination in a wireless mesh is shown. The method 100 starts with decision block 102 which determines whether a node ahs a plurality of radios. When the determination is that the node has only a single radio, then processing continues with processing block 104 which discloses transmitting control and management frames and data traffic on a same channel. When the determination made in decision block 102 is that the node does have a plurality of radios, then processing continues with processing block 106 which states assigning a first one of said plurality of radios as a control radio to a control channel, said control channel used to exchange control and management frames.

Processing block 108 recites assigning a remainder of said plurality of radios as data radios to data channels, said data channels used to transmit and receiving data.

Processing block 110 discloses reserving a data channel by exchanging control frames on said control channel. As stated in processing block 112 this includes transmitting a message from a forwarding node to a receiving node to reserve a channel for a length of time it takes to transmit said data. As further recited in processing block s 114 and 116 respectively, this can further include reserving multiple data channels for a same time interval and reserving a data channel and a control channel for a same time interval.

Processing block 118 discloses said receiving node responds with a message to said forwarding node indicating acceptance of a channel reservation request. This further includes, as shown in processing block 120, accepting a reservation comprises determining that the data channel indicated in the reservation request will become idle within a predetermined time interval and if said receiving node has at least one available radio to receive the transmission.

Processing block 122 states said forwarding node assuming a request is denied if an acceptance message from said receiving node is not received.

Processing block 124 recites a node having a plurality of radios can transmit and receive traffic on different data channels simultaneously.

Processing block 126 recites assigning a second control channel to a second control radio, wherein the second control channel is non-adjacent the data channel. The use of a second control channel also is subject to adjacent channel interference.

Processing block 128 discloses determining a CC-RTS access priority. Processing block 130 states assigning an access category (AC) to a frame based on user priority. Processing block 132 recites determining an expiration time (ET) of a frame. Processing block 134 states adding a residual lifetime (RLT) of the frame to clock time. Processing block 136 discloses adjusting a priority of the frame based on the ET of the frame. Processing block 138 states increasing frame priority when the frame has a RLT below a threshold value.

Processing block 140 recites determining a node priority. Processing block 142 discloses determining the amount of queued traffic at the node. Processing block 144 states determining the number of transmit radios at the node. Processing block 146 recites determining the node priority based on the amount of queued traffic at the node and the number of radios at the node.

As described above, the CCC protocol is a MAC protocol that provides multi-channel access by both single-radio and multiple-radio nodes. It enables nodes in a BSS or wireless mesh to access a pool of channels available for their use, as opposed to a single channel. The CC-RTS/CC-CTS handshake procedure facilitates dynamic assignment of channels to the data radios without entailing any additional signaling overhead. In addition to the basic access coordination mechanism it provides, the CCC protocol also defines a rich set of new features that enables it to address special problems, such as avoiding adjacent channel interference when using multiple radios in a single device, the hidden terminal problem, and the exposed node problem.

The multiple-channel access capability of CCC increases the aggregate throughput of a BSS or mesh network. In a special case of a mesh network consisting of mesh points equipped with one 11a data radio each, it was found that CCC could accommodate an aggregate throughput of 150 Mbps on 4 data channels, compared to 40 Mbps when using EDCA.

The ability of a node to operate multiple radios simultaneously under CCC increases node throughput. This alleviates the bottleneck at points of traffic concentration—such as the AP of a BSS or the portal, or nodes near the portal, of an infrastructure mesh. A link with multiple-radio nodes as endpoints can also furnish the higher data rates required by certain applications.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer implemented method of providing channel access coordination in a wireless mesh which enables the parallel use of multiple channels, the method comprising:
   determining whether a node has a plurality of radios, and when said node does not have a plurality of radios, then transmitting control and management frames and data traffic on a same channel; and when said node has a plurality of radios then assigning a first one of said plurality of radios as a control radio to a control channel, said control channel used to exchange control and management frames;
   assigning a remainder of said plurality of radios as data radios to data channels, said data channels used to transmit and receiving data;
   receiving acknowledgements for said data on said control channel; and determining an access priority wherein said transmitting and receiving data on said at least one data channel is performed in accordance with said access priority; and
   determining a node priority wherein said transmitting and receiving data on said at least one data channel is performed in accordance with said node priority, wherein said determining node priority comprises:
      determining the amount of queued traffic at said node;
      determining the number of transmit radios at said node; and
      determining the node priority based on the amount of queued traffic at the node and the number of radios at the node by dividing the amount of queued traffic by the number of radios.

2. The method of claim 1 further comprising reserving a data channel by exchanging control frames on said control channel.

3. The method of claim 2 wherein said reserving a data channel comprises transmitting a message from a forwarding node to a receiving node to reserve a channel for a length of time it takes to transmit said data.

4. The method of claim 3 wherein said reserving comprises reserving multiple data channels for a same time interval.

5. The method of claim 3 wherein said reserving comprises reserving a data channel and a control channel for a same time interval.

6. The method of claim 3 wherein said receiving node responds with a message to said forwarding node indicating acceptance of a channel reservation request.

7. The method of claim 6 wherein said accepting a reservation comprises determining that the data channel indicated in the reservation request will become idle within a predetermined time interval and if said receiving node has at least one available radio to receive the transmission.

8. The method of claim 3 further comprising said forwarding node assuming a request is denied if an acceptance message from said receiving node is not received.

9. The method of claim 1 wherein a node having a plurality of radios can transmit and receive traffic on different data channels simultaneously.

10. The method of claim 1 further comprising assigning a second control channel to a second control radio.

11. The method of claim 1 wherein said determining an access priority comprises:

assigning an access category (AC) to a frame based on user priority;

determining an expiration time (ET) of a frame; and adjusting a priority of the frame based on the ET of the frame.

12. The method of claim 11 wherein said determining an expiration time of a frame comprises adding a residual lifetime (RLT) of the frame to clock time.

13. The method of claim 12 wherein said adjusting a priority of a frame comprises increasing frame priority when the frame has a RLT below a threshold value.

14. The method of claim 1 wherein said receiving acknowledgments for said data on said control channel comprises receiving a group acknowledgment which identifies individual frames in a sequence of frames that were received successfully.

15. A communication system comprising:

a memory;

a processor;

a communications interface;

an interconnection mechanism coupling the memory, the processor and the communications interface; and wherein the memory is encoded with a channel access coordination application that when executed by the processor, provides a process for processing information, the process causing the computer system to perform the operations of:

determining whether a node has a plurality of radios, and when said node does not have a plurality of radios, then transmitting control and management frames and data traffic on a same channel; and when said node has a plurality of radios then assigning a first one of said plurality of radios as a control radio to a control channel, said control channel used to exchange control and management frames;

assigning a remainder of said plurality of radios as data radios to data channels, said data channels used to transmit and receiving data;

receiving acknowledgements for said data on said control channel;

wherein the process causes the communication system to determine an access priority by assigning an access category (AC) to a frame based on user priority, determining an expiration time (ET) of a frame by adding a residual lifetime (RLT) of the frame to clock time, and adjusting a priority of the frame based on the ET of the frame by increasing frame priority when the frame has a RLT below a threshold value; and wherein the process causes the communication system to determine a node priority by:

determining the amount of queued traffic at said node;

determining the number of transmit radios at said node; and determining the node priority based on the amount of queued traffic at the node and the number of radios at the node by dividing the amount of queued traffic by the number of radios.

16. The communication system of claim 15 wherein the process causes the communication system to perform:

reserving a data channel by exchanging control frames on said control channel, said reserving including transmitting a message from a forwarding node to a receiving node to reserve a channel for a length of time it takes to transmit said data, said reserving further comprising at least one of the group consisting of reserving multiple data channels for a same time interval and reserving a data channel and a control channel for a same time interval;

wherein said receiving node responds with a message to said forwarding node accepting said channel reservation request, wherein said accepting a reservation comprises determining that the data channel indicated in the reservation request will become idle within a predetermined time interval and if said receiving node has at least one available radio to receive the transmission, and said forwarding node assuming a request is denied if an acceptance message from said receiving node is not received.

17. The communications system of claim 15 wherein a node having a plurality of radios can transmit and receive traffic on different data channels simultaneously.

18. The communications system of claim 15 wherein the process causes the communication system to assign a second control channel to a second control radio, wherein said second control channel is non-adjacent said data channel.

19. The communications system of claim 15 wherein said receiving acknowledgments for said data on said control channel comprises receiving a group acknowledgment which identifies individual frames in a sequence of frames that were received successfully.

* * * * *